US010301921B2

(12) United States Patent
Arefjord

(10) Patent No.: US 10,301,921 B2
(45) Date of Patent: May 28, 2019

(54) SYSTEM AND A METHOD FOR CONTROL OF OIL AND GAS FLOW IN CONDUITS

(71) Applicant: DWC AS, Os (NO)

(72) Inventor: Anders Mathias Arefjord, Os (NO)

(*) Notice: Subject to any disclaimer, the term of this patent is extended or adjusted under 35 U.S.C. 154(b) by 190 days.

(21) Appl. No.: 15/103,471

(22) PCT Filed: Dec. 10, 2014

(86) PCT No.: PCT/NO2014/050228
§ 371 (c)(1),
(2) Date: Jun. 10, 2016

(87) PCT Pub. No.: WO2015/088354
PCT Pub. Date: Jun. 18, 2015

(65) Prior Publication Data
US 2016/0312597 A1 Oct. 27, 2016

(30) Foreign Application Priority Data

Dec. 10, 2013 (NO) .................................. 20131639

(51) Int. Cl.
E21B 43/34 (2006.01)
E21B 49/08 (2006.01)
G05D 16/20 (2006.01)
(52) U.S. Cl.
CPC ............ E21B 43/34 (2013.01); E21B 49/086 (2013.01); G05D 16/2026 (2013.01)
(58) Field of Classification Search
CPC ........ E21B 43/017; E21B 43/34; E21B 43/36; E21B 43/38; E21B 43/385; E21B 43/40; E21B 49/086
See application file for complete search history.

(56) References Cited

U.S. PATENT DOCUMENTS 3,095,889 A 7/1963 Barroll et al.
3,219,017 A 11/1965 Brown, Jr. et al.
(Continued)

FOREIGN PATENT DOCUMENTS

WO WO 2012/107727 8/2012

OTHER PUBLICATIONS

Patent Cooperation Treaty, International Search Report and Written Opinion, Application No. PCT/NO2014/050228 dated Oct. 4, 2015.

Primary Examiner — Brad Harcourt
Assistant Examiner — David Carroll
(74) Attorney, Agent, or Firm — Kilpatrick Townsend & Stockton LLP

(57) ABSTRACT

A system and a method are described for control of flow of oil and gas in pipelines on an installation in connection with testing of the oil and gas from a well, comprising: at least, a first test manifold (12,16) to which a number of wells are connected, a first pipeline (20) for flow of oil and gas from said first test manifold to sand separator equipment (30), at least, a second test manifold (14;18) to which a number of wells are connected and a second pipeline (22) for flow of the oil and gas from said second test manifold to the sand separator equipment (30). A crossflow manifold (10) is arranged between said first and second pipelines (20,22) and the sand separator equipment (30), where the crossflow manifold (10) is arranged to steer oil and gas from the first pipeline (20) to an inlet line (32) of the sand separator equipment (30), and to steer oil and gas from an outlet line (34) of the sand separator equipment (30) and to the second pipeline (22), and also that the crossflow manifold (10) is arranged to steer oil and gas from the second pipeline (22) to the inlet line (32) of the sand separator equipment (30), and to steer oil and gas from the outlet line (34) of the sand separator equipment (30) and to the first pipeline (20).

14 Claims, 4 Drawing Sheets

(56) References Cited

U.S. PATENT DOCUMENTS

Figure 1:
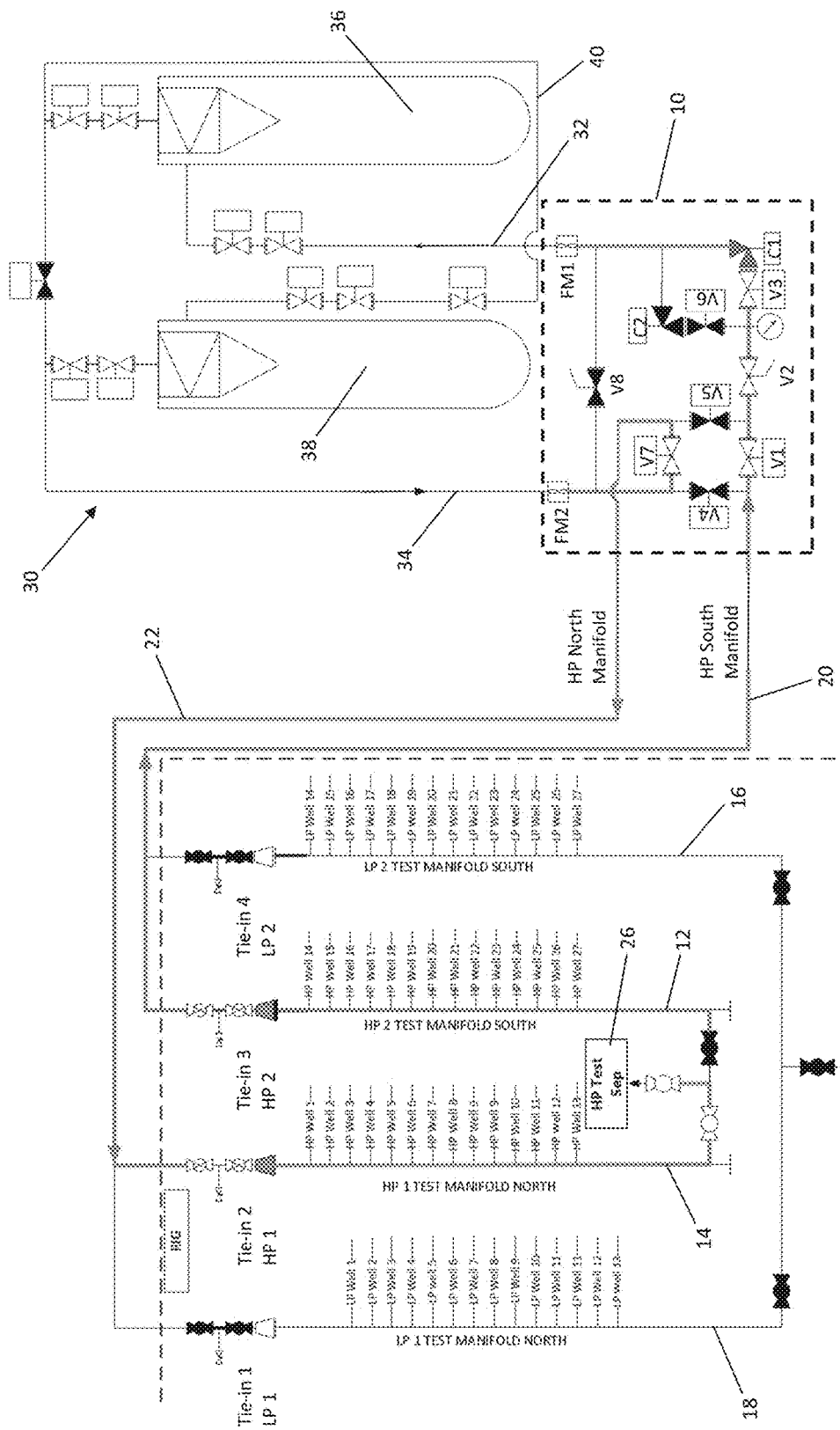

| | | | | |
|---|---|---|---|---|
| 3,562,014 A | * | 2/1971 | Childers | E21B 33/076 |
| | | | | 134/22.11 |
| 7,415,357 B1 | * | 8/2008 | Stluka | E21B 43/34 |
| | | | | 235/449 |
| 2015/0184511 A1 | * | 7/2015 | Gordon | E21B 47/10 |
| | | | | 73/152.23 |

* cited by examiner

SYSTEM AND A METHOD FOR CONTROL OF OIL AND GAS FLOW IN CONDUITS

The present invention relates to a system and a method for control of the flow and return flow of oil and gas in pipelines on an installation in connection with testing of oil and gas from a well.

The invention relates to a system for control of the flow and return flow of oil/gas from all types of gas and oil installations. A manifold that is part of the system can be used where there are several wells connected to one or more production manifolds, and to be able to steer oil/gas from the individual wells towards sand separator equipment, and also return oil/gas back to the test separators.

The manifold according to the system will be able to switch the direction of flow in one and the same pipeline, where one must normally use two pipelines for to and return flow of oil/gas.

The examples are oil/gas installations where there are high pressure wells and low pressure wells and with process systems that can not be driven against each other. A manifold according to the invention, in combination with throttle valves and flow meters, will be able to replace relatively large process systems on oil/gas installations.

In connection with petroleum related oil and gas production, large amounts of sand can be found in oil and gas flows, which must be separated out one way or another.

There are many different sand separators and most of them function after the centrifugal principle where a vortex is created so that heavier particles are flung out towards an internal wall to fall down an outlet, while light gases rise and are taken out through an upper outlet.

Known solutions for removing sand normally comprise a circular-cylindrical tank, albeit often with a lower conical, tapered part towards the outlet for the particles. The force on the particles will thereby, in the main, be the same in the whole of the tank.

For oil companies, the separating out of particles, for example, during oil and gas production, leads to large costs and a considerable labour effort because the sand particles are damaging to the equipment the mixture is led through. This can be transport pipes, or ship tanks and refineries. Within the processing industry particles can also lead to corrosion on pipe systems and tanks for one thing, with safety risks and also blocking of filters.

For example, sand separator systems can be used in the form of a dynamic particle separator for cyclone separation of sand from a flowing medium in connection with petroleum related oil and gas production, where the separator comprises a housing containing a cyclone tank that is equipped with an upper inlet opening and an upper and a lower outlet opening for outflow of the flowing medium and particles from the tank, respectively. Furthermore, several particle separators can be used in series.

Oil and gas that have been through a sand separator operation are thereafter sent on to a test separator for testing of quality and characteristics. The first phase contains test separator-sand trap measurements to verify the effectivity of the sand separator package. Oil/gas/water is thereafter separated further in a three phase separator to be used and/or exported.

From patent literature, reference is made to WO 2012107727 A2 and U.S. Pat. No. 7,415,357 B1, and that show a device for carrying out well-test operations on an oil and gas well and a method to receive a set of oil well test results from a set of measuring devices in a well test separator, respectively.

It is an object of the invention to provide a system that makes it possible to control the flow of gas and oil between test manifolds and sand separator equipment in connection with testing of a well, and which leads to the number of pipelines that are used in this regard being reduced.

The above mentioned objects are achieved with a system for control of a flow of oil and gas in pipelines in an installation in connection with testing of oil and gas from a well, comprising, at least, a first test manifold to which a number of wells are connected, a first pipeline for flow of oil and gas from said first test manifold and to sand separator equipment, and also, at least, a second test manifold to which a number of wells are connected and a second pipeline for flow of gas and oil from said second test manifold and to the sand separator equipment. A crossflow manifold is arranged between the first and the second pipeline and the sand separator equipment, where the crossflow manifold is arranged to steer oil and gas from the first pipeline to an inlet line of the sand separator equipment, and to steer oil and gas from an outlet line of the sand separator equipment and to the second pipeline, and also that the crossflow manifold is arranged to steer oil and gas from the second pipeline to the inlet line of the sand separator equipment, and to steer the oil and gas from the outlet line of the sand separator equipment to the first pipeline.

Alternative embodiments are given in the dependent claims.

The first test manifold can be a high pressure test manifold for a number of wells that produce under high pressure, and/or the first test manifold can be a low pressure test manifold for a number of wells that produce under low pressure, and where the well that is selected for testing is chosen from one of said wells.

The second test manifold can be a high pressure test manifold for a number of wells that produce under high pressure, and/or the second test manifold can be a low pressure test manifold for a number of wells that produce under low pressure, and where the well which is selected for testing is chosen from one of said wells.

Said high pressure test manifolds can be connected to a high pressure separator tank, and said low pressure test manifolds can be connected to a low pressure separator tank, as the testing of the chosen well is carried out in one of said separator tanks.

Furthermore, the separator tanks can be connected with respective process systems or process installations.

The crossflow manifold can comprise several automatic stop valves for control of the oil and gas through the manifold. The crossflow manifold can also comprise a number of manual stop valves.

Furthermore, the crossflow manifold can comprise a number of throttle valves for control of the flow into the inlet line of the sand separator equipment. Said throttle valves can also be arranged to regulate the pressure on the flowing medium.

The crossflow manifold can be placed adjoining the sand separator equipment.

Furthermore, the crossflow manifold can be coupled to at least one gas flowmeter and at least one liquid flowmeter.

Said test manifolds can be connected to respective production manifolds, and the oil and gas from the wells that are not tested can be led to said production manifolds and from here on to respective process systems or process installations.

The above mentioned object are also achieved with a method for control of flow of oil and gas in pipelines in an installation in connection with testing of oil and gas from a well, comprising, at least, a first test manifold, to which a number of wells are connected, and a first pipeline connected between said first test manifold and sand separator equipment, and also, at least, a second test manifold, to which a number of wells are connected, and a second pipeline connected between said second test manifold and the sand separator equipment. The method comprises opening for flow of oil and gas from a chosen well, connected to either the first test manifold or the second test manifold, steering the oil and gas from the first pipeline to an inlet line of the sand separator equipment, and steering the oil and gas from an outlet line of the sand separator equipment to the second pipeline, or steering oil and gas from the second pipeline to the inlet line of the sand separator equipment, steering oil and gas from the outlet line of the sand separator equipment and to the first pipeline, and opening for flow to a high pressure separator from the first or the second pipeline, or opening for flow to a low pressure separator tank from the first or the second pipeline, and also carrying out the test of the chosen well in one of said separator tanks.

The invention shall now be described in more detail with the help of the enclosed figures, in which FIGS. 1-4 show principle diagrams of different flow modes in the system according to the invention.

Sand separator equipment 30 is shown to the right in FIGS. 1-4 in the form of, for example, several dynamic particle separators 36,38, in the case shown two, for cyclone separation of sand. The particle separators can be connected in series so that a flow of oil/gas goes in through an inlet or an inlet line 32 and to the first separator 36, thereafter the oil/gas can be led further to the second separator 38 via a pipeline 40. The oil/gas that comes out from the second separator 38 can flow out through an outlet or an outlet line 34. Sand that is removed can be collected in a separate tank.

Respective inlet lines and outlet lines 32,34 are connected to a manifold 10 according to the invention, also called a crossflow manifold. Furthermore, two pipelines 20,22 are preferably connected to the crossflow manifold 10 for flow of oil and gas from a chosen well. The first pipeline 20 is connected to respective test manifolds 12, 16 on one side of the production tree in the form of a high pressure test manifold and a low pressure test manifold, respectively, and the second pipeline 22 is connected to test manifolds 14, 18 respectively on an other side of the production tree, in the form of a high pressure test manifold and a low pressure test manifold, respectively.

Flow from or to respective pipelines 20,22 is steered in respective connections tie-in 1-4, where said connections comprise a number of valves.

As can be seen, respective high pressure test manifolds 12,14 are connected to a high pressure separator tank 26 for testing of the flowing medium. From the separator tank 26, the oil/gas can be led to a process system (not shown). Correspondingly, respective low pressure manifolds 16,18 are connected to a low pressure separator tank 24 for testing of the flowing medium. From the separator tank 24 the oil/gas can be led to a process system (not shown).

The test manifolds can, for example, be placed over the production manifolds (not shown), so that the flow from wells that are not tested is led directly from a respective production manifold and to process systems.

The crossflow manifold 10 can comprise the following components:
V1—Automatic stop valve
V2—Manual stop valve
V3—Automatic stop valve
V4—Automatic stop valve
V5—Automatic stop valve
V6—Automatic stop valve
V7—Automatic stop valve
V8—Manual stop valve
C1—Automatic throttle valve
C2—Automatic throttle valve
FM1—Gas flowmeter
FM2—Liquid flowmeter The FIGS. 1-4 show different flow modes for a well that shall be tested. White valves illustrate that they are open, while black valves illustrate that they are closed. With HP is meant high pressure and with LP is meant low pressure.

In FIG. 1 the flow goes from one of the wells connected to the HP 2 test manifold 12 via the open connection tie-in 3 of the first pipeline 20, thereafter the flowing medium goes into the crossflow manifold 10. In the crossflow manifold the flowing medium goes through the valves V1, V2, V3, through the throttle valve C1 and past the gas flowmeter FM1. Thereafter, it goes out from the crossflow manifold 10, into the inlet line 32 and through the sand separator equipment 30. The flowing medium out from the sand separator equipment 30 comes out through the outlet line 34 and into the crossflow manifold 10 via the liquid flowmeter FM2, and thereafter through the valve V7 and out in the second pipeline 22. The flowing medium is further led on to the HP1 test manifold 14 via the open connection tie-in 2 and further to the HP test separator 26. After the flowing medium is tested in the test separator, it can be led further to a production installation.

In the crossflow manifold 10 the flowing medium can possibly be led via the valve V6 and to the second throttle valve C2 before it goes further to the gas flowmeter FM1. The aim of the second throttle valve C2 is to provide a redundant system in case the first throttle valve C1 breaks down or requires maintenance. This is also the case for the other flow modes.

The throttle valves C1,C2 are, as mentioned, arranged to steer the flow into the inlet line 32 of the sand separator equipment 30. In addition, said throttle valves C1,C2 are arranged to regulate the pressure on the flowing medium. This means that one can take flowing medium from a high pressure side and return it to a low pressure side or viceversa. A high pressure test separator operates readily at a pressure of 56 bar, while a low pressure test separator generally operates at a pressure of 17 bar. The throttle valves will also be able to contribute to the wells that produce at different pressures not being affected.

Figure 2:
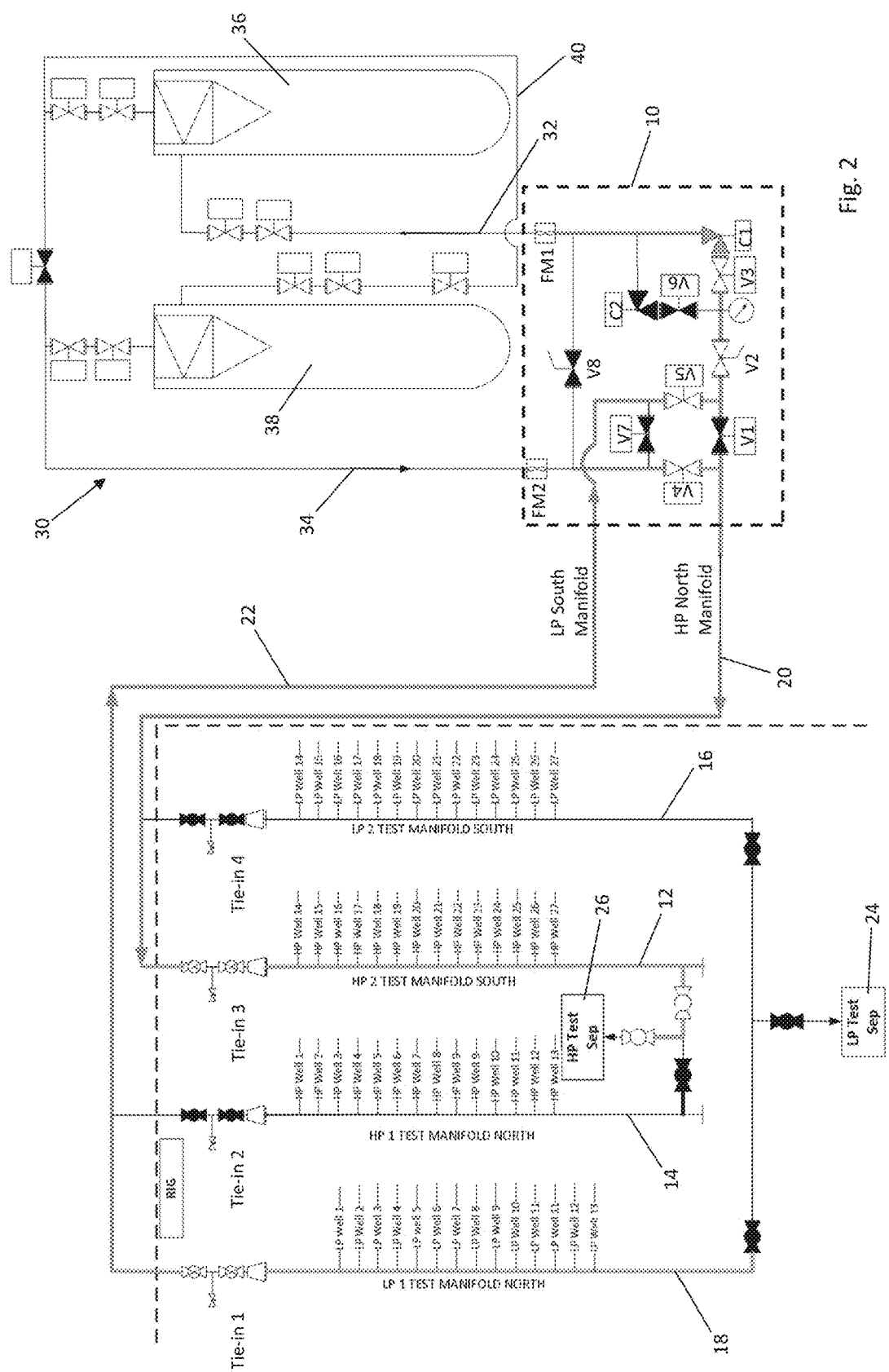

In FIG. 2, the flow from one of the wells coupled to the LP1 test manifold 18 goes via the open connection tie-in 1 of the second pipeline 22, thereafter the flowing medium goes into the crossflow manifold 10. In the crossflow manifold, the flowing medium goes through the valves V5, V2, V3 through the throttle valve C1 and past the gas flowmeter FM1. Thereafter it flows out from the crossflow manifold 10 and into the inlet line 32 and through the sand separator equipment 30. The flowing medium out from the sand separator equipment comes out in the outlet line 34 and into the crossflow manifold 10 via the liquid flowmeter FM2, thereafter through the valve V4 and out in the first pipeline 20. Furthermore, the flowing medium is led into the HP 2 test manifold 12 via the open connection tie-in 3 and further to the HP test separator 26. After the flowing medium has been tested in the test separator, it can be led on to the production installation.

Figure 3:
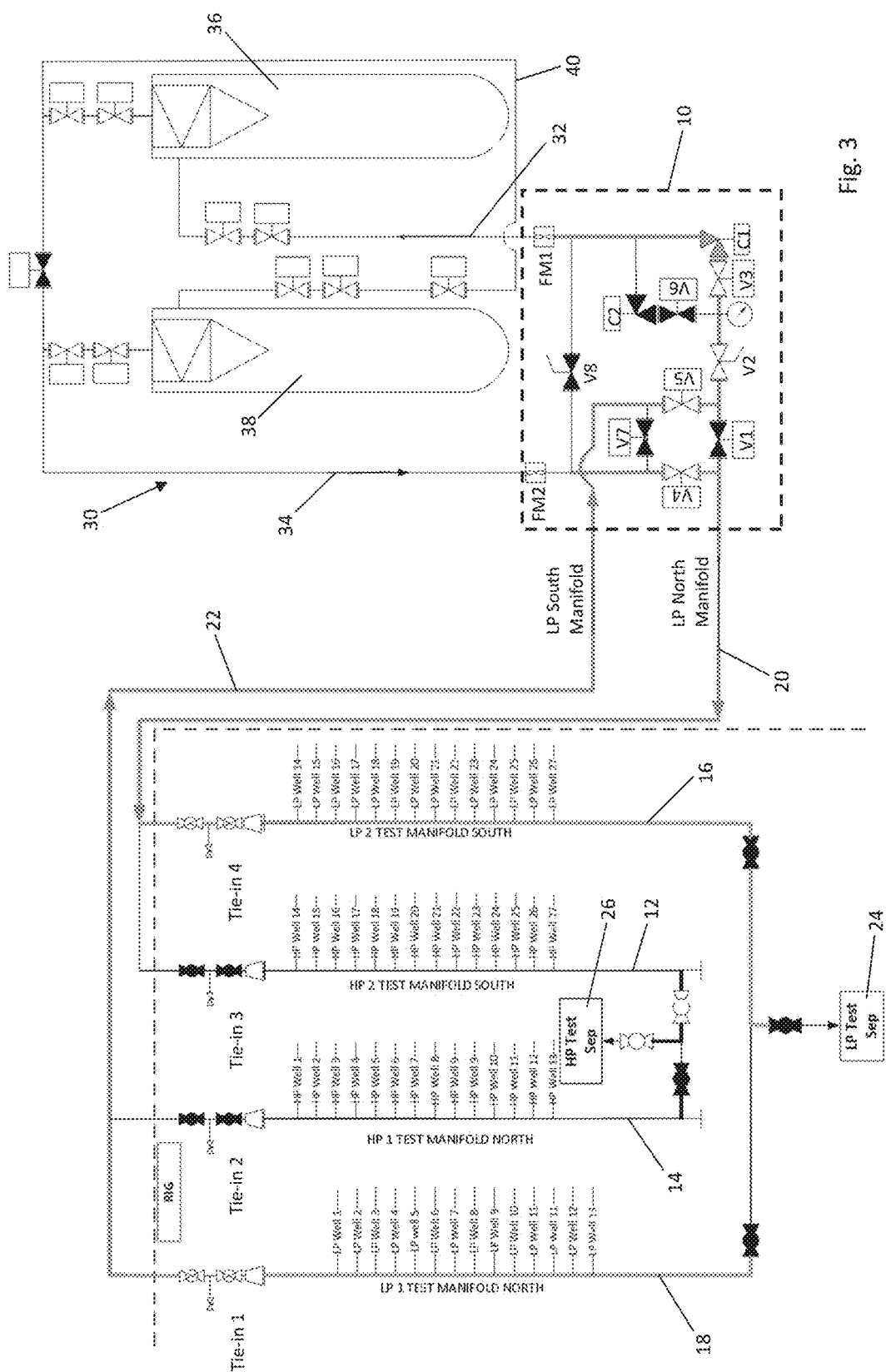

In FIG. 3 the flow from one of the wells coupled to LP 1 test manifold 18 goes via the open connection tie-in 1 to the second pipeline 22, thereafter the flowing medium goes into the crossflow manifold 10. In the crossflow manifold the flowing medium goes through the valves V5, V2, V3, through the throttle valve C1 and past the gas flowmeter FM1. Thereafter, it goes out from the crossflow manifold 10 and into the inlet line 32 and through the sand separator equipment 30. The flowing medium out from the sand separator equipment 30 comes out in the outlet line 34 and into the crossflow manifold 10 via the liquid flowmeter FM2, thereafter through the valve V4 and out in the first pipeline 20. The flowing medium is further led into the LP 2 test manifold 16 via the open connection tie-in 4 and further to the LP test separator 24. After the flowing medium has been tested in the test separator it can be led on to the production installation.

Figure 4:
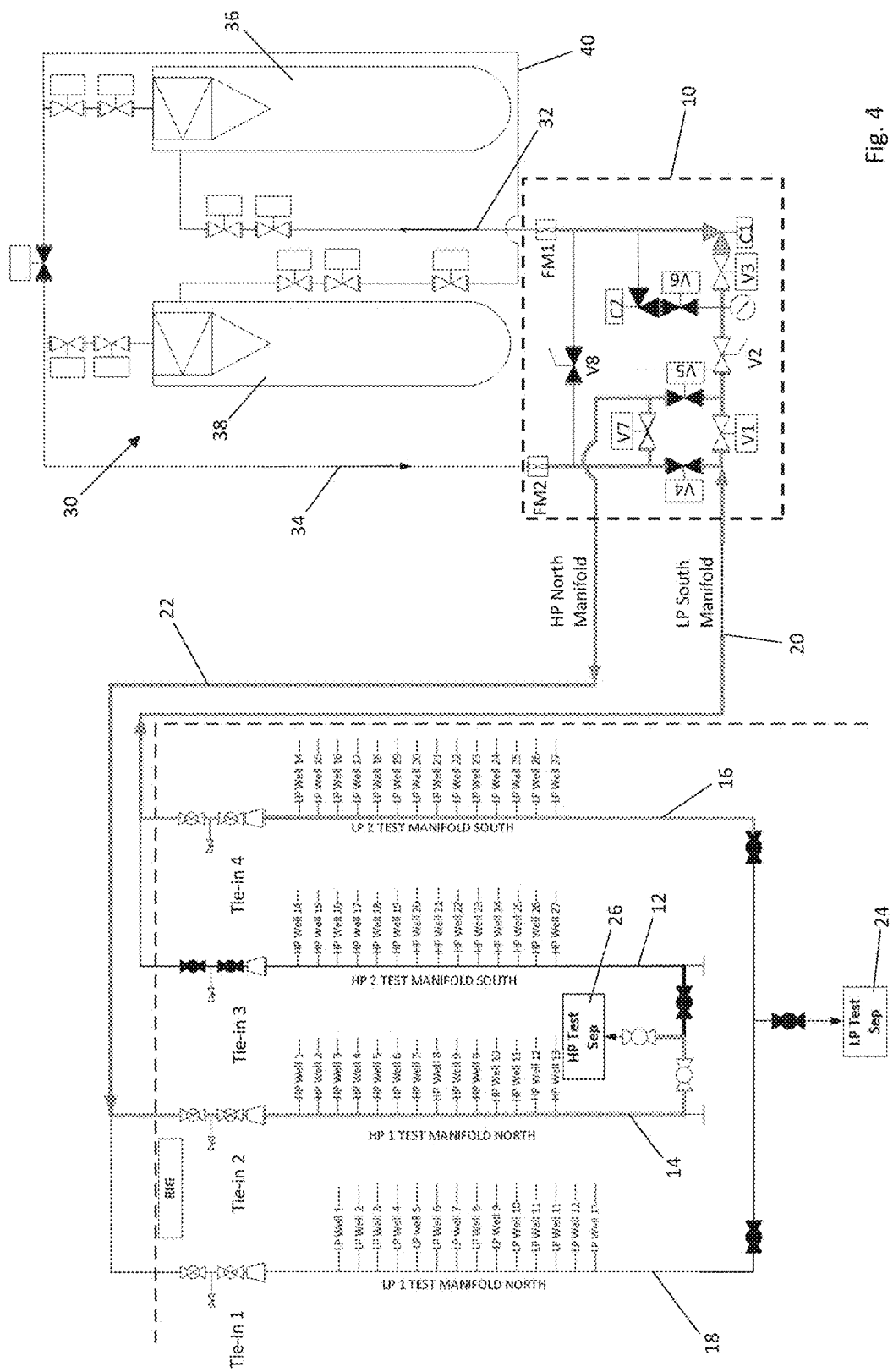

In FIG. 4 the flow goes from one of the wells connected to the LP2 test manifold 16 via the open connection tie-in 4 to the first pipeline 20, thereafter the flowing medium goes into the crossflow manifold 10. In the crossflow manifold the flowing medium goes through the valves V1, V2, V3, through the throttle valve C1 and past the gas flowmeter FM1. Thereafter it goes out from the crossflow manifold 10 and into the inlet line 32 and through the sand separator equipment 30. The flowing medium from the sand separator equipment 30 comes out in the outlet line 34 and into the crossflow manifold 10 via the liquid flowmeter FM2, thereafter through the valve V7 and out in the second pipeline 22. The flowing medium is now led further into the HP 1 test manifold 14 via the open connection tie-in 2 and onto the HP test separator 26. After the flowing medium is tested in the test separator it can be led onto the production installation.

The system can also be driven in bypass mode (not shown). The flowing medium is then led into the crossflow manifold 10 via either the valves V1 or V5, through V2, V3, C1, and V8 and thereafter out through either V4 or V7.

It shall be pointed out that the gas flowmeter FM1 and the liquid flowmeter FM2 can readily be placed the other way round to that shown, although the shown placing is to be preferred, i.e. that the gas flow meter FM1 can be placed towards the outlet 34 and the liquid flowmeter can be placed towards the inlet 32.

The invention claimed is:

1. A system for control of flow of oil and gas in pipelines on an installation in connection with testing of oil and gas from a well, comprising:
    at least a first test manifold (12;16) to which a first group of wells are connected,
    a first pipeline (20) for flow of oil and gas from said first test manifold to sand separator equipment (30),
    at least a second test manifold (14;18) to which a second group of wells are connected,
    a second pipeline (22) for flow of oil and gas from said second test manifold to the sand separator equipment (30), wherein
    a crossflow manifold (10) is arranged between said first and second pipelines (20,22) and the sand separator equipment (30), wherein a first configuration of the crossflow manifold (10) is arranged to steer oil and gas from the first pipeline (20) to an inlet line (32) of the sand separator equipment (30), and to steer oil and gas from an outlet line (34) of the sand separator equipment (30) to the second pipeline (22), and wherein a second configuration of the crossflow manifold (10) is arranged to steer oil and gas from the second pipeline (22) to the inlet line (32) of the sand separator equipment (30), and to steer oil and gas from the outlet line (34) of the sand separator equipment (30) to the first pipeline (20).

2. The system according to claim 1, in which the first test manifold (12) is a high pressure test manifold for at least one of the first group of wells that produce under high pressure, and/or the first test manifold (16) is a low pressure test manifold for at least one of the first group of wells that produce under low pressure.

3. The system according to claim 1, in which the second test manifold (14) is a high pressure test manifold for at least one of the second group of wells that produce under high pressure, and/or the second test manifold (18) is a low pressure test manifold for at least one of the second group of wells that produce under low pressure.

4. The system according to claim 2, in which said high pressure test manifolds (12,14) are connected to a high pressure separator tank (26), and said low pressure test manifolds (16,18) are connected to a low pressure separator tank (24), wherein testing of oil and gas is carried out in one of said separator tanks (26,24).

5. The system according to claim 4, in which the separator tanks (24,26) are connected to respective process systems.

6. The system according to claim 1, in which the crossflow manifold (10) comprises several automatic stop valves (V1,V3,V4,V5,V6,V7) for control of the oil and gas through the manifold (10).

7. The system according to claim 1, in which the crossflow manifold (10) comprises a number of manual stop valves (V2,V8).

8. The system according to claim 1, in which the crossflow manifold (10) comprises a number of throttle valves (C1,C2) for control of the flow into the inlet line (32) of the sand separator equipment (30).

9. The system according to claim 8, in which said throttle valves (C1,C2) are arranged to regulate the pressure on a flowing medium.

10. The system according to claim 1, in which the crossflow manifold (10) comprises, or is connected to, at least one gas flowmeter (FM1) and at least one liquid flowmeter (FM2).

11. The system according to claim 1, in which said test manifolds (12,14,16,18) are connected to respective production manifolds, and that the oil and gas from wells that are not tested are led to said production manifolds and from there on to respective process systems.

12. A method for control of the flow of oil and gas in pipelines on an installation in connection with testing of the oil and gas from a well, the method comprising
    providing at least a first test manifold (12;16), to which a first group of wells are connected, and a first pipeline (20) connected between said first test manifold and the sand separator equipment (30), and also at least one second test manifold (14;18), to which a second group of wells are connected, and a second pipeline (22) connected between said second test manifold and the sand separator equipment (30),
    opening flow of oil and gas from a chosen well connected to either the first test manifold (12;16) or the second test manifold (14:18),
    steering oil and gas from the first pipeline (20) to an inlet line (32) of the sand separator equipment (30), and to steer oil and gas from an outlet line (34) of the sand separator equipment (30) to the second pipeline (22) or to steer oil and gas from the second pipeline (22) to the inlet line (32) of the sand separator equipment (30), and to steer oil and gas from the outlet line (34) of the sand separator equipment (30) to the first pipeline (20), and
    opening flow to a high pressure separator tank (26) from the first or the second pipeline (20,22), or to open for flow to a low pressure separator tank (24) from the first or the second pipeline (20,22), and testing of the chosen well in one of said separator tanks (26,24).

13. The system according to claim 3, in which said high pressure test manifolds (12,14) are connected to a high pressure separator tank (26), and said low pressure test manifolds (16,18) are connected to a low pressure separator tank (24), wherein testing of oil and gas is carried out in one of said separator tanks (26,24).

14. The system according to claim 13, in which the separator tanks (24,26) are connected to respective process systems.

\* \* \* \* \*